United States Patent Office 3,402,525
Patented Sept. 24, 1968

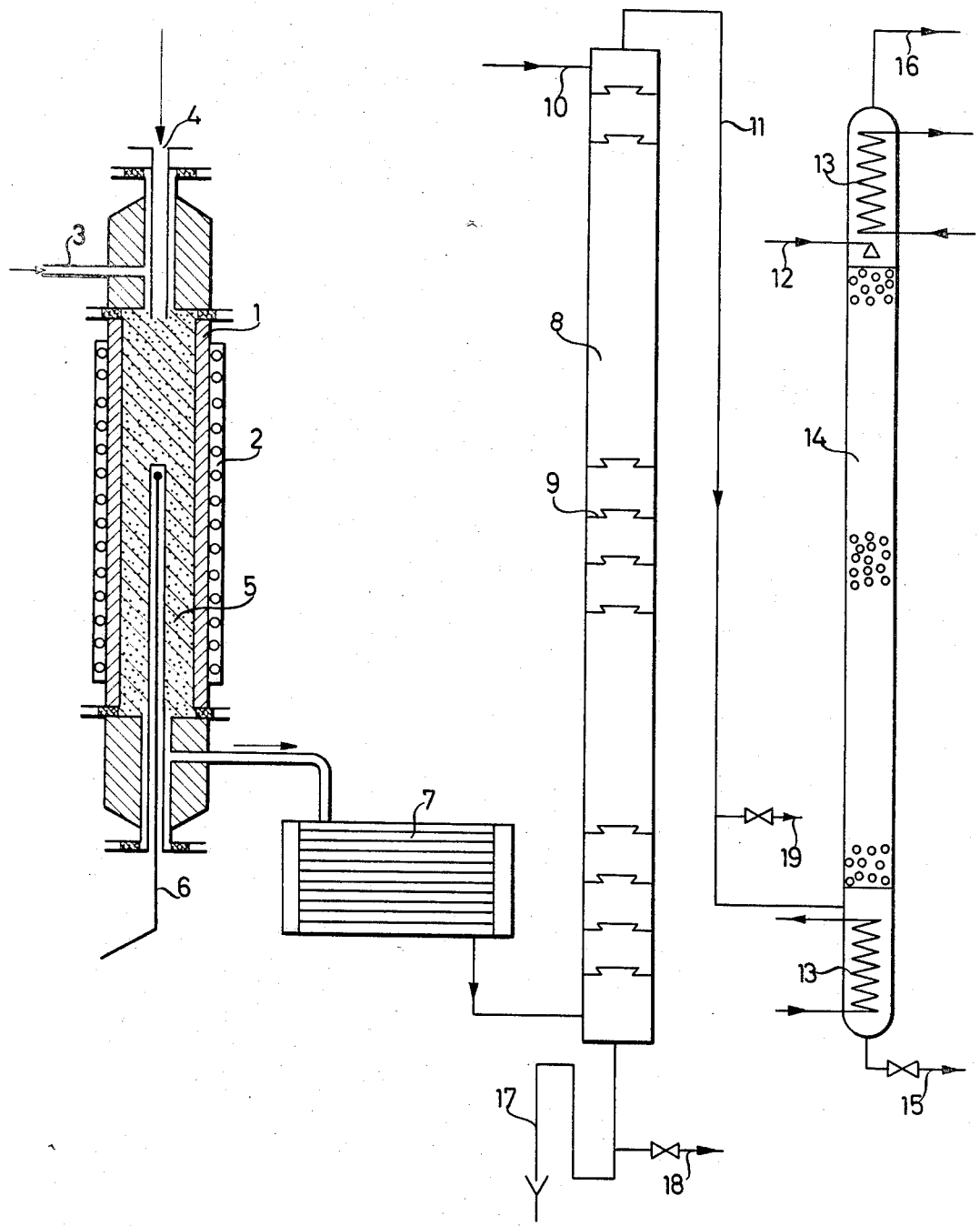

3,402,525
SEPARATION OF HYDROGEN FLUORIDE FROM GAS MIXTURES CONTAINING HYDROGEN CHLORIDE AND HYDROGEN FLUORIDE
Peter Frisch, Frankfurt am Main, and Jürgen Korinth, Hofheim, Taunus, Germany, assignors to Farbwerke Hoechst Aktiengesellschaft vormals Meister Lucius & Bruning, Frankfurt am Main, Germany, a corporation of Germany
Continuation of application Ser. No. 592,885, Nov. 8, 1966. This application Oct. 27, 1967, Ser. No. 678,763
39 Claims. (Cl. 55—71)

ABSTRACT OF THE DISCLOSURE

There is disclosed herein a process for separating hydrogen fluoride from a crude gas mixture, originating from the fluorination with hydrogen fluoride of a chlorine-containing aliphatic compound, by scrubbing the crude gas with concentrated aqueous hydrogen chloride wherein, prior to scrubbing, the crude gas and water are passed together at elevated temperature over active carbon.

---

The present invention relates to a process for separating hydrogen fluoride from gas mixtures containing hydrogen chloride and hydrogen fluoride.

In the fluorination of chlorohydrocarbons by reacting them with hydrogen fluoride it is, in general, impossible or, in view of the desired reaction product, sometimes not expedient to cause to react the total amount of hydrogen fluoride used. In these cases, a mixture of hydrogen fluoride and hydrogen chloride is obtained in addition to the organic reaction products. With mixtures of this type, it is known to separate the organic substances from the hydrogen halides by scrubbing with water and/or with aqueous alkaline solutions. The hydrogen halides then pass into the waste water and are lost for further utilization. In industrial plants not only the losses of valuable hydrofluoric acid and hydrochloric acid are thus considerable, but the sewage is polluted to an undesired extent.

It is possible to recover the hydrogen chloride by adiabatic absorption with water, but the hydrochloric acid thus obtained is unsuitable for most purposes as long as it still contains noticeable amounts of hydrofluoric acid. Even in concentrations of e.g. 50 p.p.m. and less, hydrofluoric acid distinctly attacks glass and enamel.

Even without special consideration of the fluorination of chlorohydrocarbons, one is faced with the general problem of separating or recovering the hydrogen fluoride from other mixtures of hydrogen fluoride and hydrogen chloride, that may further contain substances insoluble or practically insoluble in water or aqueous acids, for example organic substances, in such a manner that the hydrogen chloride obtained after the said separation is practically free from hydrogen fluoride.

U.S. Patent 2,690,815 contributes towards the solution of the aforesaid problem. The particular object of the said patent is, however, the recovery of anhydrous hydrogen fluoride and it is, therefore, restricted to the treatment of gas mixtures containing at least 5% of HF. To solve the problem in this case it is sufficient when in Example 1 of the above patent the content of hydrogen fluoride in the gas mixture is reduced from 7% to 2.4%. The further treatment of the hydrogen chloride still containing considerable amounts of HF is not accurately described: absorption in aqueous hydrochloric acid, distillation of anhydrous hydrogen chloride and returning of hydrofluoric acid-containing solution. This process is complicated by the distillation step. With the dilution of the circulated hydrofluoric acid of about 40% strength by means of an undefined amount of aqueous hydrochloric acid it cannot be seen how hydrofluoric acid of sufficient concentration can be obtained so as to enable a recovery of anhydrous hydrogen fluoride by fractionation.

The process described in U.S. patent specification 2,345,696 makes use of the fact that in the distillation of an aqueous solution of HCl and HF the distillate contains a greater proportion of HCl. Therefore HCl and HF are first absorbed in water and then subjected to distillation. It is also proposed to contact the gas mixtures, instead of with water, with hydrochloric acid of 37% strength which naturally does no longer absorb any hydrogen chloride but parts of the hydrogen fluoride. However, the hydrochloric acid obtained in this manner is not free from hydrogen fluoride and the process is rather complicated and difficult to control owing to the numerous absorption and distillation steps.

It has now been found that hydrogen fluoride can be substantially separated from gaseous mixtures of hydrogen fluoride and hydrogen chloride, which mixtures may contain further inert inorganic or organic compounds that are insoluble or practically insoluble in water or hydrochloric acid, using a continuous scrubbing device, by scrubbing the gases in a cascade arrangement, preferably a tray column in counter-current flow with a concentrated aqueous solution of hydrogen chloride at a temperature below +50° C., advantageously in the range of from +20° C. to −20° C.

Accompanying substances of HCl and HF are preferably those which are insoluble or practically insoluble in water or aqueous solutions of HCl and HF, or which are not decomposed by water, such as, for example, air, $N_2$, $Cl_2$, hydrocarbons, especially halocarbon or halohydrocarbon compounds in which chlorine and/or fluorine are the halogens. Especially suitable are mixtures comprising 0.1 to 10% by volume, advantageously 1 to 5% by volume of HF, 40 to 90% by volume of HCl, besides remaining halocarbon or halohydrocarbon compounds.

As cascade-like scrubbing devices, in which a mixing of the individual scrubbing stages with one another is substantially suppressed, tray columns are preferably used, for example valve tray columns or slotted tray columns, especially bubble cap columns. By the latter there are to be understood all constructions using the principle of the cap, whether the installations are round like a cap, rectangular or of box-type design as in the "Thormann column."

The number of trays depends on the desired degree of purity and the construction of the trays. In general, at least 3, advantageously 5 to 50 and more, advantageously 10 to 30 trays or cascades are used. If the trays are of poor efficiency, more than 50 trays may be required.

In addition to a good scrubbing effect, a tray column or an equivalent cascade arrangement offers the further advantage that the condensates of organic substances, if any, may be separated in each tray by a suitable device and discharged separately. As absorption liquid for HF a concentrated aqueous solution of hydrogen chloride is preferably used, i.e. concentrated hydrochloric acid which, when absorbing HF, desorbs certain amounts of HCl into the gaseous phase and leaves the scrubbing device in the form of an aqueous solution of hydrogen chloride and hydrogen fluoride.

When the gas mixture to be purified contains a sufficiently high amount of hydrogen fluoride, for example 3 mol percent or more, preferably more than 10 mol percent, it is possible to drive out the hydrogen chloride from the absorption liquid almost quantitatively and to obtain as the effluent a solution of hydrogen fluoride of high concentration which only contains a minor amount of hydrogen chloride. It is then expedient first to absorb in known manner the principal amount of the gaseous HF with a more diluted aqueous solution of HF of about 40% strength, for example 38 to 50% strength, in a scrubbing device according to the invention before the remainder of HF is removed with hydrochloric acid according to the invention. Both steps can be performed in the same scrubbing device, for example by feeding at the head a concentrated aqueous solution of HCl and in a suitable intermediate tray, for example in the lower third of the column, an aqueous solution of HF of 38 to 50% strength, preferably about 40% strength. The absorption liquid obtained which contains a higher amount of HF can then be subjected to fractional distillation in known manner. The small amount of HCl escapes as a gas at the head while the excess above 40% is recovered from the scrubbing acid or bottom acid flowing off at the lower end of the column in the form of anhydrous HF and the remaining hydrofluoric acid of about 40% strength is used for a further absorption.

The concentrated aqueous HCl to be used as scrubbing liquid according to the invention, can be fed as such, i.e. for example as acid of about 38% strength, or in the form of a more dilute acid, for example of about 32% strength as obtained in industry in the adiabatic absorption. Alternatively, water can be used since in the presence of gaseous HCl, according to the partial pressure of the latter, a concentrated hydrochloric acid having in general a strength of 40 to 45% forms at once by absorption of the gaseous HCl in the aqueous phase. In the latter case, however, the generated absorption heat must be dissipated by suitable cooling devices.

The temperatures at which the absorption of HF takes place is given by the requirement that the vapor pressure of HF above the scrubbing acid, depending on the concentration of HF in the latter and on the temperature, must be smaller than the partial pressure of HF in the incoming gas mixture. Under these conditions only an absorption of HF from the gaseous phase can take place. The lower the temperature, the better the scrubbing effect. The scrubbing temperature should, therefore, be below +50° C., advantageously in the range of from +20° C. to −20° C. It is likewise possible, of course, to operate at a still lower temperature, for example −35° C. or there below, provided that a condensation of organic substance in the scrubbing device, if any, is tolerated and solid phases in the system HCl/HF/H$_2$O are avoided.

The dissipation of the absorption heat in the scrubbing column can be brought about in known manner, for example by external cooling, internal cooling or, as in the following examples, by a cooling cycle. In many cases it is sufficient to cool the incoming gases in order to obtain the desired scrubbing temperature.

The scrubbing temperature and the HF content of the gas mixture to be purified as well as the amount of water introduced into the scrubbing device with the scrubbing liquid determine the upper limit of the concentration of HF in the scrubbing acid leaving the column. The amount of water introduced as such or preferably in the form of a concentrated aqueous solution of hydrogen halide, the halogen being F and/or Cl, especially hydrogen chloride, should be at least 5 grams, in general 10 to 250 grams and preferably 20 to 120 grams of water for each mol of hydrogen fluoride to be absorbed. It is also possible, however, to use a larger amount of water, for example 1000 grams. In this case a higher amount of scrubbing acid contaminated with HF is obtained. With a given HF concentration in the gas mixture to be purified the required amount of water decreases with the scrubbing temperature and the scrubbing acid or bottom acid flowing off contains a higher proportion of HF. The lower scrubbing temperatures are, therefore, preferred, especially temperatures in the range of from 0° C. to −20° C., as the further treatment of the scrubbing acid is easier the higher its concentration of HF, whether with a sufficiently high concentration anhydrous hydrogen fluoride is produced or the fluorine ion is precipitated as an insoluble compound. Of course, to maintain the equilibrium the amount of HF that leaves the scrubbing device with the scrubbing liquid must correspond to the amount of HF introduced with the gas mixture.

For simplicity's sake, the hydrogen fluoride can be separated from the gas mixture approximately at atmospheric pressure. In view of apparatus of smaller dimensions and an improved scrubbing effect, it is advantageous to carry out the separation under superatmospheric pressure, for example up to 5 atmospheres, preferably under a pressure of 1 to 3 atmospheres.

The pressure depends, for example, on the material of which the scrubbing device is made. It is advantageous to use graphite, especially impregnated graphite or graphite that has been densified in different manner. Other materials which are resistant to the action of aqueous solutions of HCl and HF may also be used, for example polyethylene or silver.

The aforesaid process permits substantially to remove hydrogen fluoride from the specified gas mixtures containing HCl and HF. Hydrochloric acid subsequently obtained, for example by adiabatic absorption in water, contains less than 2 p.p.m. of HF, i.e. less than the amount determinable by analysis.

However, the hydrochloric acid obtained after the purification often contains small amounts of HF, for example 100 to 300 p.p.m., when in the aforesaid process so-called crude gases from fluorination processes are used. By crude gases from fluorination processes there are to be understood gas mixtures as obtained in the reaction of halogenated carbon or hydrocarbon compounds, which may contain fluorine in addition to chlorine, by means of hydrogen fluoride with the use of various catalysts such as, for example, antimony chlorofluorides, chromium oxyfluorides, or aluminium fluoride. Said crude gas mixtures contain considerable amounts of hydrogen chloride to be recovered for further use.

Now, it has been found that crude gases originating from the fluorination with hydrogen fluoride of chlorine-containing aliphatic carbon compounds, which besides carbon and chlorine may also contain fluorine and hydrogen, can be purified by first passing the crude gases with water at elevated temperature, for example steam, over active carbon and, after said treatment, removing in a cascade arrangement, preferably a tray column as described above, the hydrogen fluoride with concentrated hydrochloric acid or water which forms hydrochloric acid in the scrubbing column.

As crude gases from fluorination processes are preferred those originating from the fluorination of chlorine-containing paraffins having 1 to 4 carbon atoms, advantageously 1 to 2 carbon atoms.

The treatment of the crude gases with active carbon is advantageously performed at a temperature in the range of from 60 to 150° C., more advantageously 80 to 120° C. It can also be carried out, however, at lower temperatures, for example room temperature, or at higher temperatures, for example 200° C.

An especially good effect is obtained when the amount of water and the temperature are chosen in such a manner that in the reaction vessel containing the active carbon the water is only present in the gaseous state, that is to say the carbon is dry and contains water only in the form of absorbed phase. The amount of water required can be supplied in the liquid state. It is more advantageous, however, to introduce it in the vaporized state. As active carbon a commercial type is suitably used, for example granulated or extruded active carbon. When the treatment is to be carried out in a fluid bed a finer type of active carbon can also be used.

Possibly, in the presence of active carbon, a catalytic reaction of fluorine-containing impurities with the added water takes place with formation of hydrogen fluoride capable of being washed out, whereas without such reaction over active carbon such impurities only partially react in the scrubbing device with the water of the scrubbing acid and partially react with water in the absorption of hydrogen chloride in water, especially when the absorption is connected with a rise in temperature, whereby such impurites give off HF and thus contaminate the recovered hydrochloric acid.

The amount of water required in the treatment with active carbon depends on the amount of fluorine-containing impurities in the gas mixture, the temperature applied and the effectiveness of the active carbon. It can be easily determined by a preliminary test or read off the vapor pressure curve of the water. Under normal conditions it may amount to 1 to 100 grams or more for each cubic meter of crude gas. In general, an amount of water of 3 to 30 grams, preferably 5 to 15 grams for each cubic meter of crude gas is sufficient. The amount of water to be used in the treatment with active carbon also depends on the further treatment of the gas mixture after its contact with active carbon. When by the cascade scrubbing with concentrated hydrochloric acid the hydrofluoric acid is to be recovered in concentrated form, the upper limit of the amount of water to be added is given by the amount of hydrogen fluoride contained in the crude gas. Of course, smaller amounts and also higher amounts of water may sometimes be deemed advantageous.

The water required in the treatment with active carbon can also be added in the form of aqueous hydrochloric or hydrofluoric acid, for example in the form of the bottom acid leaving the scrubbing device. As is the case with pure water, the acid is suitably vaporized before it is introduced.

The continuous addition of such small amounts of water during the treatment with active carbon, advantageously in the form of steam, is sometimes difficult as regards its dosage. The same effect can be obtained when the water is added discontinuously, for example at intervals of 1 to 2 minutes or more, for example 7 or 15 minutes.

The residence time of the crude gases in the reaction space filled with active carbon is, in general, 1 to 60 seconds, preferably 5 to 20 seconds. Longer periods of time are possible, but with regard to a larger reaction space required they only offer slight advantages. On the other hand, with a residence time of less than 1 second a partial effect is obtained so that the residence time or the dimensions of the reaction space largely depend on the efficiency of the removal of the disturbing compounds, that is to say on the demands made on the hydrochloric acid recovered after the separation of hydrofluoric acid.

The reaction space filled with active carbon can have a capacity of 0.3 to 20 liters/cb. m./hr. of crude gas, advantageously 2 to 6 liters/cb. m./hr.

The reaction vessel in which the crude gas is treated with active carbon and water is preferably made of carbon, more preferably graphite. Any other material having a sufficient resistance to corrosion is, however, likewise suitable.

The crude gas can be treated with active carbon and water under most different pressures, above all at atmospheric pressure and also at superatmospheric pressure, pressures of 1 to 10 and advantageously 1 to 3 atmospheres being especially suitable, provided that the apparatus is pressure resistant.

The crude gas from a fluorination process treated with active carbon and water can be completely freed from hydrogen fluoride by intensely scrubbing it with hydrochloric acid as described above, especially in a cascade arrangement, preferably a bubble cap column.

By combining the treatment of the crude gases from a fluorination process with water and active carbon with the subsequent scrubbing with aqueous solutions of hydrogen halides, particularly in a cascade arrangement, preferably a bubble cap column, the hydrochloric acid which is obtained from the crude gas, for example by adiabatic absorption, is substantially freed—to the limit of detection—from hydrofluoric acid. The concentraction of the hydrochloric acid obtained by absorbing the hydrogen chloride in water naturally varies with the amount of water used for the absorption.

The efficiency of the present process in the treatment of crude gas mixtures from fluorination processes is surprising. It is a considerable progress in the art that crude gases from fluorination processes can be separated from the fluorine-containing constituents to such an extent that hydrogen fluoride and above all hydrogen chloride are obtained in an industrially useful quality in the form of concentrated aqueous acids.

The following examples serve to illustrate the invention but they are not intended to limit it thereto.

Example 1

A polyethylene column with an internal diameter of 11 cm. having 30 bubble cap trays, 1 bubble cap being on each tray, the distance of trays being 11 cm., was filled with about 4 liters of concentrated hydrochloric acid. At the bottom a gas mixture was introduced consisting of 2 cb. m./hr. of HCl, 1.2 cb. m./hr. of $N_2$ and 80 grams/hr. of HF. At the head of the column hydrochloric acid of 38% strength was fed in an amount of 160 ml./hr. Two of the lowest trays were maintained at a temperature of about —3° C. by circulating the scrubbing liquid contained therein by means of a pump through a cooler outside of the column.

The gas mixture leaving at the head of the column contained 0.0007% by weight of HF, calculated on the hydrogen chloride.

Example 2

In an arrangement as described in Example 1, four bubble cap trays were maintained at a temperature of —12° C. by circulating the scrubbing liquid to an external cooler. Half of the remaining column was cooled from the outside to a temperature of —15 to —20° C. The gas mixture leaving at the head contained less than 0.0001% by weight of HF, calculated on the hydrogen chloride.

With a feed of the column of 100 ml./hr. of concentrated hydrochloric acid, hydrofluoric acid of 51% strength was withdrawn at the bottom containing 1.7% of HCl.

Example 3

In an arrangement as described in Example 2, four of the lowest bubble cap trays were maintained at +20° C. by a cooling cycle and the remaining column was cooled from the outside to about —3° C. At the head of the column 100 ml. of concentrated HCl were introduced per hour. The gas mixture leaving at the head contained less than 0.0001% by weight of HF, calculated on HCl.

Example 4

A column as described in Example 2, in which the trays with cooling cycle were maintained at about —10° C. and the other part of which was insulated and kept at temperatures from —2° C. at the bottom to +16° C. at the head, was charged at the lower end with 2 cb. m./hr. of a gas mixture consisting of approximately 40% by volume of fluorichloromethanes, 57% by volume of HCl and 3% by volume of HF. At the head of the column 100 ml./hr. of hydrochloric acid of about 38% strength were introduced.

In continuous operation at the bottom of the column an acid solution containing about 44% of HF and about 5% of HCl was discharged. From the gas mixture leaving at the head of the column hydrochlic acid of about 32% strength could be obtained by adiabatic absorption in water, which acid contained less than 0.0002% by weight of HF.

Example 5

The process of this example is shown in the accompanying drawing.

A tube of impregnated graphite 1 surrounded by a heating jacket 2 was charged approximately at atmospheric pressure through conduit 3 with a crude gas originating from the fluorination of $CCl_4$ with hydrogen fluoride in the presence of a chromium oxyfluoride catalyst (British specification 1,025,759) and approximately consisting of 38.5 mol percent of halogenated methanes, 60 mol percent of HCl and 1.5 mol percent of HF in an amount of about 3 cb. m./hr. The tube was filled with 10 liters of granulated active carbon 5. Through conduit 4, 60 grams/hr. of $H_2O$ were added in the form of steam. The active carbon had a temperature of about 140° C. A thermoelement 6 was used to control the temperature. The effluent gas passed a cooler 7 and entered a bubble cap column 8 made of polyethylene, as in Example 1, and provided with 32 trays 9. At the head 10 of the column 200 ml./hr. of HCl of 38% strength were introduced. The column was maintained at a temperature of +6° to +8° C.

From the crude gas leaving the column through conduit 11 hydrochloric acid of 39% strength was obtained by scrubbing with water, which acid contained less than 2 p.p.m. of HF.

The column 8 was provided at the bottom with an effluent 17 for the scrubbing or bottom acid. Numerals 18 and 19 designate sampling valves for the scrubbing acid and the gas, respectively.

When the process was carried out under identical conditions but without the addition of water in the treatment with active carbon, the recovered hydrochloric acid contained 96 p.p.m. of HF.

Example 6

In an arrangement as used in Example 5, the temperature of the active carbon was about 91° C. 15 grams/hr. of $H_2O$ were added in the form of steam. After scrubbing a hydrochloric acid of about 41% strength was obtained containing 3 p.p.m. of HF.

When the addition of water to the active carbon was increased to 30 grams/hr., the hydrochloric acid obtained contained less than 2 p.p.m. of HF.

Under otherwise identical conditions but without addition of water in the active carbon treatment a hydrochloric acid was obtained containing 98 p.p.m. of HF.

Example 7

In an arrangement as used in Example 5 the temperature of the active carbon was about 114° C. Every 4 minutes 1 gram of water was given on the active carbon. After scrubbing hydrochloric acid of 41% strength was obtained having less than 2 p.p.m. of HF.

The same result was obtained when every 8 minutes 2 grams of water were added to the active carbon.

Example 8

A crude gas originating from the fluorination of $CHCl_3$ with hydrogen fluoride in the presence of an antimony catalyst and still containing about 4 mol percent of HF was passed in an amount of approximately 1.5 cb. m./hr. through an arrangement as described in Example 5. The active carbon had a temperature of about 130° C. Every 7.5 minutes 2 grams of water were added to the active carbon. After scrubbing hydrochloric acid of 39.7% strength was obtained containing 45 p.p.m. of HF.

When 2 grams of water were added every 4 minutes, the hydrochloric acid obtained only contained 15 p.p.m. of HF.

Under otherwise identical conditions but without addition of water, the hydrochloric acid obtained contained 328 p.p.m. of HF.

Example 9

In an arrangement as described in Example 5, a crude gas originating from the fluorination of $CCl_4$ with hydrogen fluoride in the presence of an aluminum fluoride catalyst (U.S. Patent 2,946,828) and approximately consisting of 38 mol percent of halogenated methanes, 59 mol percent of HCl and 3 mol percent of HF was passed in an amount of about 3 cb. m./hr. approximately at atmospheric pressure together with 20 grams/hr. of $H_2O$ in the form of steam over 5.8 liters of active carbon 5 having a temperature of about 140° C. The gas was then conducted through a bubble cap column 8 having 32 trays, the lowest 4 of which were connected with a cooling cycle and maintained at about −6° C. The remainder of the column was insulated and had a temperature of +4° to +17° C. increasing from the cooling cycle to the head of the column. At the head 10 200 ml./hr. of HCl of 38 percent strength were introduced into the column.

After having left the bubble cap column 8, the gas was passed through scrubber 14 with coolers 13 and scrubbed with water flowing in through conduit 12. The hydrogen chloride was recovered from the gas mixture by adiabatic absorption in the form of hydrochloric acid of about 33% strength containing less than 1 p.p.m. of HF. The fluorinated methanes left the scrubber 14 through conduit 16.

Example 10

In an arrangement as described in Example 5, a crude gas originating from the fluorination of $CCl_4$ with hydrogen fluoride (as in Example 9) and approximately consisting of 38 mol percent of halogenated methanes, 59 mol percent of HCl and 3 mol percent of HF was passed in an amount of about 6 c.b.m./hr. approximately at atmospheric pressure over 24 liters of active carbon 5 together with 30 grams/hr. of $H_2O$ in the form of steam. The active carbon had a temperature of about 102° C. The gas was then conducted through a bubble cap column 8 the lowest 4 trays of which were maintained at about −3° C. The remainder of the column had a temperature of +5° to +8° C. At the head of the column 10 300 ml./hr. of hydrochloric acid of 38% strength were introduced.

After having left the bubble cap column, hydrochloric acid of about 39% strength containing less than 2 p.p.m. of HF was obtained from the gas by absorption in water.

In a comparative process without treatment with active carbon the hydrochloric acid still contained about 100 p.p.m. of HF.

Example 11

In an arrangement as described in Example 5 a crude gas originating from the fluorination of hexachloroethane with hydrogen fluoride in the presence of a chromium oxyfluoride catalyst (British specification 1,025,759) and containing approximately 22 mol percent of HF was passed in an amount of about 2 cb. m./hr. at atmospheric pressure together with 60 grams/hr. of water in the form of steam over 6 liters of active carbon 5. The active carbon had a temperature of 100° C. The gas was then conducted through a bubble cap column 8 made of polyethylene (as in Example 5) and maintained at about 20° C. The trays of the column were not cooled. At the head of the column 10 200 ml./hr. of hydrochloric acid of 38% strength were introduced. After the purified gas mixture had left the column 8, hydrochloric acid of about 32% strength was recovered by adiabatic absorption with water 14, which acid contained less than 1 p.p.m. of HF.

In a comparative process without treatment with active carbon the recovered hydrochloric acid still contained about 100 p.p.m. of HF.

We claim:

1. In a process for separating hydrogen fluoride from a crude gas mixture originating from the fluorination of aliphatic, chlorine-containing carbon compounds, which may contain F and H besides C and Cl, with hydrogen fluoride by scrubbing the crude gas with a concentrated aqueous solution of hydrogen chloride, the steps of passing the crude gas over active carbon at elevated temperature together with water, and separating the hydrogen fluoride present in said treated crude gas mixture in counter-current flow with a concentrated aqueous solution of hydrogen chloride or water forming hydrochloric acid in the scrubbing device in a cascade arrangement or a tray column.

2. The process of claim 1, which comprises treating crude gases originating from the fluorination of chlorine-containing paraffins with 1 to 4 carbon atoms.

3. The process of claim 1, which comprises treating crude gases originating from the fluorination of chlorine-containing paraffins with 1 to 2 carbon atoms.

4. The process of claim 1, wherein the cascade arrangement or the tray column has 3 to 50 cascades or trays.

5. The process of claim 1, wherein the gas is scrubbed in a bubble cap column.

6. The process of claim 1, wherein 10 to 1000 grams of $H_2O$ are passed through the scrubbing device for each mol of hydrogen fluoride to be absorbed.

7. The process of claim 1, wherein 20 to 120 grams of $H_2O$ are passed through the scrubbing device for each mol of hydrogen fluoride to be absorbed.

8. The process of claim 1, wherein the scrubbing of the gas is performed at a temperature of $+50$ to $-35°$ C.

9. The process of claim 1, wherein the scrubbing of the gas is performed at a temperature of $+20$ to $-20°$ C.

10. A process for separating hydrogen fluoride from a gas mixture with hydrogen chloride containing more than 3 mol percent of hydrogen fluoride and possibly other inert constituents that are practically insoluble in hydrochloric acid, by scrubbing the gas mixture with a concentrated aqueous solution of hydrogen chloride as claimed in claim 1, which comprises performing the scrubbing in a tray column with 3 to 50 trays and adding in the lower third of the column aqueous hydrofluoric acid, preferably hydrofluoric acid of 38 to 50% strength.

11. The process of claim 1, wherein the scrubbing is performed under a pressure of 1 to 5 atmospheres.

12. The process of claim 1, wherein the active carbon treatment is carried out at a temperature of 60 to 150° C., under a pressure of 1 to 10 atmosphers and with a residence time of the crude gas of 1 to 60 seconds.

13. The process of claim 1, wherein the active carbon treatment is carried out at a temperature of 80 to 120° C., under a pressure of 1 to 3 atmospheres and with a residence time of the crude gas of 5 to 20 seconds.

14. The process of claim 1, wherein 1 to 100 grams of water are passed over the active carbon for each cubic meter of crude gas.

15. The process of claim 1, wherein 5 to 15 grams of water are passed over the active carbon for each cubic meter of crude gas.

16. The process of claim 1, wherein the water required in the active carbon treatment is added in the form of an aqueous solution of hydrogen chloride or hydrogen fluoride or a mixture thereof.

17. The process of claim 1, wherein the water required in the active carbon treatment is added in the form of the bottom acid leaving the scrubbing device for the separation of hydrogen fluoride.

18. The process of claim 1, wherein a crude gas originating from the fluorination of carbon tetrachloride is treated.

19. The process of claim 1, wherein a crude gas originating from the fluorination of chloroform is treated.

20. The process of claim 1, wherein a crude gas originating from the fluorination of hexachlorethane is treated.

21. A process for separating hydrogen fluoride from a crude gas originating from the fluorination of chlorine-containing paraffins with 1 to 4 carbon atoms with hydrogen fluoride, which comprises passing the crude gas under a pressure of 1 to 3 atmospheres and at a temperature of 60 to 150° C. over granulated active carbon together with 5 to 15 grams of steam for each cubic meter of crude gas, with a residence time of the crude gas of 5 to 20 seconds and then separating the hydrogen fluoride present from the crude gas in counter-current flow in a bubble cap column at a temperature of $+20$ to $-20°$ C. with 20 to 250 grams of water in the form of a concentrated aqueous solution of hydrogen chloride for each mol of HF to be absorbed.

22. A process for separating hydrogen fluoride from a crude gas originating from the fluorination of chlorine-containing paraffins with 1 to 4 carbon atoms with hydrogen fluoride, which comprises passing the crude gas together with water at elevated temperature and with a residence time of the gases of 1 to 60 seconds over active carbon, and separating the hydrogen fluoride present in said treated crude gas in counter-current flow with 10 to 1000 grams of water in the form of a concentrated aqueous solution of hydrogen chloride for each mol of HF to be absorbed at a temperature of $+50$ to $-35°$ C. and under a pressure of 1 to 3 atmospheres in a cascade arrangement or a tray column with 3 to 50 cascades or trays.

23. The process of claim 22, wherein after the separation of hydrogen fluoride the hydrogen chloride is recovered by adiabatic absorption in water.

24. In a process for separating hydrogen fluoride from a crude gas mixture originating from the fluorination with hydrogen fluoride of a chlorine-containing aliphatic compound, which compound may also contain either or both fluorine and hydrogen, by scrubbing said crude gas with a concentrated aqueous solution of hydrogen chloride, the step of passing said crude gas over active carbon at elevated temperature together with water prior to scrubbing said grude gas.

25. The process of claim 24 wherein said aliphatic compound is a paraffin of 1 to 4 carbon atoms.

26. The process of claim 24 wherein said crude gas is passed over said active carbon at a temperature of about 60° C. to about 150° C.

27. The process of claim 24 wherein about 1 to about 100 grams of water per cubic meter of said crude gas are passed over said active carbon.

28. The process of claim 24 wherein about 5 to about 15 grams of water per cubic meter of said crude gas are passed over said active carbon.

29. The process of claim 24 wherein liquid water is added to said crude gas passing over said active carbon.

30. The process of claim 24 wherein water in a gaseous state is added to said crude gas passing over said active carbon.

31. The process of claim 24 wherein water containing hydrogen chloride or hydrogen fluoride is added to said crude gas passing over said active carbon.

32. The process of claim 24 wherein said water is added continuously.

33. The process of claim 24 wherein said water is added intermittently.

34. The process of claim 24 wherein said water is added at intervals of about 1 to about 15 minutes.

35. The process of claim 24 wherein said crude gas has a residence time of about 1 to about 60 seconds while passing over said active carbon.

36. The process of claim 24 wherein the reaction space filled with said active carbon is about 0.3 to about 20 liters per cubic meter of said crude gas passing therethrough per hour.

37. The process of claim 24 wherein said crude gas is passed over said active carbon at a pressure of about 1 to about 10 atmospheres.

38. The process of claim 24 wherein said active carbon is granular.

39. The process of claim 24 wherein said aliphatic compound is a paraffin of 1 to 2 carbon atoms, said crude gas is passed over granular active carbon at a temperature of about 80° C. to about 120° C. at a pressure of about 1 to about 3 atmospheres at a residence time thereover of about 5 to about 20 seconds, and water in gaseous state is added to said crude gas at a rate of about 5 to about 15 grams per cubic meter of said crude gas.

No references cited.

REUBEN FRIEDMAN, *Assistant Examiner.*

C. N. HART, *Assistant Examiner.*